US011052434B2

(12) United States Patent
Gillies et al.

(10) Patent No.: US 11,052,434 B2
(45) Date of Patent: Jul. 6, 2021

(54) POSITIVE AIR PRESSURE SYSTEM (PAPS) FOR CAMERA ENCLOSURES IN DIRTY ENVIRONMENTS

(71) Applicant: Raytheon Canada Limited, Ottawa (CA)

(72) Inventors: Robert Gillies, Toronto (CA); Paul Moosie, Mississauga (CA)

(73) Assignee: Raytheon Canada Limited

( * ) Notice: Subject to any disclaimer, the term of this patent is extended or adjusted under 35 U.S.C. 154(b) by 106 days.

(21) Appl. No.: 15/851,559

(22) Filed: Dec. 21, 2017

(65) Prior Publication Data

US 2018/0178259 A1   Jun. 28, 2018

Related U.S. Application Data

(60) Provisional application No. 62/438,815, filed on Dec. 23, 2016.

(51) Int. Cl.
| | |
|---|---|
| *B08B 5/02* | (2006.01) |
| *B08B 17/02* | (2006.01) |
| *F04D 29/54* | (2006.01) |
| *H04N 5/225* | (2006.01) |
| *F04D 19/00* | (2006.01) |

(52) U.S. Cl.
CPC ............. *B08B 5/02* (2013.01); *B08B 17/02* (2013.01); *F04D 29/547* (2013.01); *H04N 5/225* (2013.01); *H04N 5/2252* (2013.01); *H04N 5/2257* (2013.01); *F04D 19/002* (2013.01)

(58) Field of Classification Search
CPC .......... B08B 5/02; B08B 17/02; H04N 5/225; H04N 5/2252; H04N 5/2257

USPC ............................. 15/250.01; 359/507, 509
See application file for complete search history.

(56) References Cited

U.S. PATENT DOCUMENTS

| | | | |
|---|---|---|---|
| 5,708,859 A * | 1/1998 | Tajima | G02B 27/0006 396/25 |
| 6,536,961 B1 | 3/2003 | Gillies | |
| 2008/0285132 A1 * | 11/2008 | O'Kane | G02B 27/0006 359/509 |

(Continued)

FOREIGN PATENT DOCUMENTS

CN        101923271 A  * 12/2010

OTHER PUBLICATIONS

Translation of CN 101923271, Retrieved from Espacent on Jul. 24, 2019 (Year: 2010).*
Origianl Document of CN101923271B (Year: 2011).*

*Primary Examiner* — Laura C Guidotti
*Assistant Examiner* — Thomas Raymond Rodgers

(57) ABSTRACT

A positive air pressure system resists debris accumulation on an active surface and comprises a frustum-shaped shroud with a baffle plate therein dividing the shroud into baffles, including a positive pressure chamber and a passive back pressure chamber interconnected through an orifice in the baffle plate. An inlet opening is formed in the shroud and in fluid communication with the proximal baffle and a positive pressure air source and to receive air through the inlet opening from the positive pressure air source and create a high-pressure region, greater than a pressure region in the passive back pressure chamber, and in front of the active surface and to expel air out of the positive pressure chamber and into the passive back pressure chamber through the orifice in the baffle plate.

22 Claims, 5 Drawing Sheets

(56) References Cited

U.S. PATENT DOCUMENTS

| | | | |
|---|---|---|---|
| 2010/0165103 A1* | 7/2010 | Adrian | H04N 7/183 |
| | | | 348/143 |
| 2012/0243093 A1* | 9/2012 | Tonar | G03B 17/08 |
| | | | 359/507 |
| 2013/0011254 A1* | 1/2013 | Avedon | F04D 25/08 |
| | | | 415/221 |

* cited by examiner

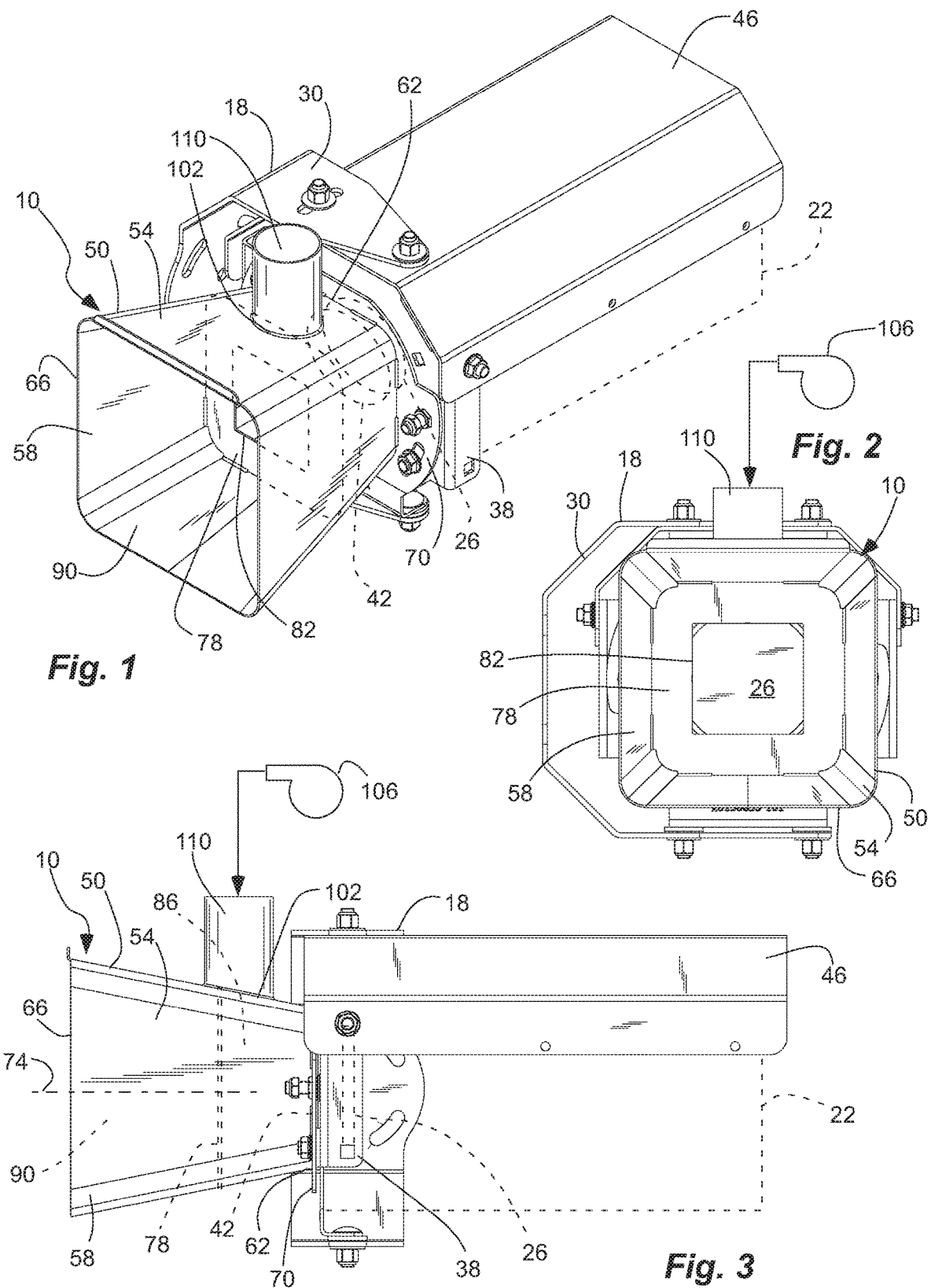

POSITIVE AIR PRESSURE SYSTEM (PAPS) FOR CAMERA ENCLOSURES IN DIRTY ENVIRONMENTS

RELATED APPLICATIONS

This application claims the benefit of U.S. Provisional Patent Application Ser. No. 62/438,815, filed Dec. 23, 2016, which is herein incorporated by reference in its entirety.

BACKGROUND

It can be desirable to keep certain active surfaces clean. Such active surfaces can include sensors, detectors, emitters, etc., with surfaces to be kept clean of debris. For example, tolling cameras are located along highways, usually directly above or next to moving vehicles. Such tolling cameras are exposed to dust, dirt and salt laden spray or mist, which can coat all surfaces, and which can obscure camera vision and impede the ability to take quality images of vehicles and license plates. This accumulation of debris on the camera enclosure window is the main factor that reduces the quality of the images captured by a camera mounted outdoors.

Some camera suppliers accept that it is inevitability that camera windows will get dirty, and require cleaning the windows by hand, or by installing a washer or wiper system to clean the camera window remotely as required in between regularly schedule maintenance cleaning. In dusty or polluted locations or those prone to winter road maintenance, several additional window cleanings per season would be normal. The hand cleaning solution requires a cleaning crew to travel to a site, which is both expensive and dangerous due to the required highway or lane closures. The washer fluid and wiper system works, and can yield good results depending on the type of dirt film on the window and ambient operating temperatures, but it becomes much less effective when temperatures are at or below freezing.

The washer systems, either fluid and wiper, or fluid only, require regular onsite maintenance to replenish the fluid and replace wiper rubber element. Their effectiveness is similar to that experienced on car windshields, which can at times require repeated washing to achieve an acceptable result. The mechanical wiper's physical contact with the window will eventually damage the delicate optical coatings on the window. The alternate fluid only solution does not physically contact the window, but does not achieve consistent smear free windows depending on the nature of the debris being removed, the type of fluid, and the ambient temperature during the cleaning. Both these systems are reactive solutions and require a significant amount of individual monitoring during the cleaning process to achieve a streak and "water spot" free and optically clean surface. They also physically obstruct the camera views and impact performance during the cleaning process.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1 is a partial perspective view of a positive air pressure system (PAPS) in accordance with an example, shown for use with a camera or camera enclosure.

FIG. 2 is a partial front view of the PAPS of FIG. 1.

FIG. 3 is a partial side view of the PAPS of FIG. 1.

Figure 4:
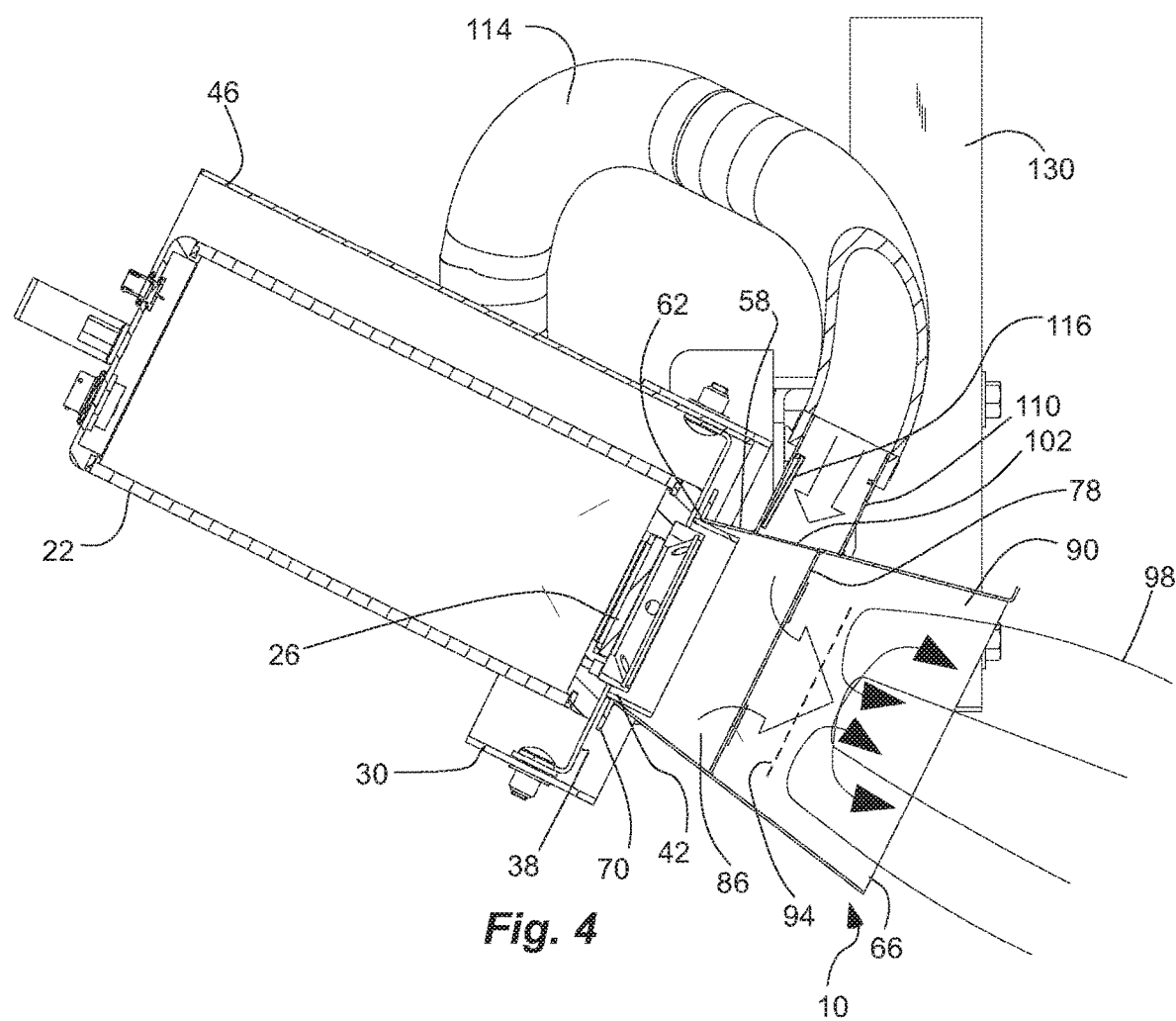
FIG. 4 is a partial cross-sectional side view of the PAPS of FIG. 1, taken along line 4 of FIG. 5, and also showing air flow schematically.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "active surface" refers to a surface with is desired to be kept clean and free of fouling or debris. In one aspect, the active surface is a window of a camera or camera housing or enclosure. In another aspect, the active surface can be a lens of the camera. In another aspect, the active surface can be a window of a sensor, meter, etc. In another aspect, the active surface can be the surface of the sensor, meter, etc. In another aspect, the active surface can be an optical or sensor surface.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed herein is a positive air pressure system (PAPS) that can be utilized with an active surface. By way of example, the present PAPS is described for use with a tolling camera system. Thus, the PAPS can be associated with a camera mounted to a gantry or other structure over or beside a roadway, a building, a vehicle, a ship, etc. As stated above, such cameras are typically mounted along or above highways and moving vehicles, and thus subjected to dust, dirt and salt laden spray and mist that can coat all surfaces of the camera or camera enclosure, and can obscure camera vision.

The PAPS is a proactive solution designed to keep a camera enclosure window clean enough to ensure that high quality images can be captured. In one aspect, no more than two on-road cleaning services per year are required to maintain the PAPS. Because the PAPS actively prevents dirt from getting to and sticking to the window's surface, it significantly reduces the accumulation of particulates on the camera window, which results in high quality images and reduces the number of time consuming unscheduled cleanings and maintenance costs.

In one aspect, the PAPS can comprise four subsystems, namely: a clean air intake (CAI), a positive pressure chamber (PPC), a passive back pressure chamber (PBPC), and a hydrophobic coated window. Combined, these subsystems can actively keep the camera window clean by both establishing an invisible air barrier in front of the camera window that stops most of the dirt laden moisture or droplets from getting to the window, and which may breach the barrier and contact the camera window's surface. The PAPS provides multiple barriers to resist dirt from getting to the camera window, and then repelling any dirt that may contact the window's surface. This approach is in sharp contrast the current approach of cleaning the window after it gets too dirty for high quality images to be taken through the dirty window.

The Clean Air Intake (CAI) can be a maintenance free, filterless clean air intake whose air source can be in an area contaminated with dust and salt spray. In one aspect, this is accomplished with a three stage system, namely: 1) the air intake can be located at the highest point at a site to be as far away a possible from the highway and vehicles, the primary source of the dirt and salt and mist in the area; 2) a Low Pressure Chamber creates a low air speed intake that ensures minimal suspended particulates are drawn in through the a screen or flow restrictor, and potentially deposited onto the camera window; and 3) the clean air flows through a high mean-time-between-failure (MTBF) fan into a High Pressure Chamber, and onwards to a Positive Pressure Chamber of a camera shroud. Thus, the cleanest air available at the site is drawn in by the CAI subsystem. The CAI is typically located high above the vehicle traffic on top of the gantry on which cameras are mounted. This location places the air intake as far away as practical from the source of swirling medium (1 to 100 µm) to large (>100 µm) size airborne particles (i.e. windblown dust, salt spray) created by vehicles speeding by below. Even in this preferred location, the air drawn in may be contaminated. To further minimize the amount of airborne particles drawn into the system, the CAI is designed as a low air speed intake. This low speed air flow is the result of the small difference between the low air pressure in the Low Pressure Chamber and the ambient air pressure outside the CAI. This pressure differential coupled with a flow restrictor screen produces a low air speed that draws in very little, if any, medium airborne particles, and no large airborne particles. The result is a cleaner source of air that can be fed into a Positive Pressure Chamber (PPC) of a camera shroud to actively create the first air barrier in front of the camera window. In one aspect, several clean air intakes can be distributed over a site, with one for each camera. In another aspect, the clean air intake can be a centrally located unit for a site with several cameras. In extremely polluted environments, an auxiliary particulate filter may be used to prescreen the air.

Air from the CAI is directed to a camera shroud which has two chambers, namely: a Positive Pressure Chamber (PPC) in the rear and a Passive Back Pressure Chamber (PBPC) in the front. The PPC is located directly in front of the camera window. As the air is forced into PPC it creates a uniform air barrier in front of the camera window. Air from this positive pressure barrier continuously flows out into the PBPC in the front area of the camera shroud. This positive air barrier effectively stops external air with any airborne particles from entering the PPC and potentially contacting the camera window. The shroud creates a clean air high pressure region in front of the camera window that resists dirt from entering the chamber and contacting the window surface. Air is continually expelled out of the PPC and into the PBPC of the shroud.

The Passive Back Pressure Chamber (PBPC) in the shroud creates a dead-air space directly in front of the camera window. The shroud not only reduces image glare on images from incidental light sources, but is shaped to naturally create a dead air buffer in front of the camera window whenever air enters the shroud towards the camera window. Thus, whenever air enters the front of the camera shroud into the PBPC, this chamber's shape, with a large opening at the front of the chamber reducing to a smaller area towards a rear end adjacent to the PPC, creates a high air pressure area towards the rear end. This passive air buffer is bolstered by the higher air pressure region actively created by the PPC and by the air flowing out of the PPC into the PBPC. The result is two distinct air barriers: a positive pressure barrier and a fortified passive air pressure barrier. The combined effect of these protective air buffers ensures that very little if any dirt actually makes contact with or accumulates on the camera window. To further improve the PBPS performance, a check valve can resist air back feeding and collapsing the back pressure.

The final barrier can be a molecular hydrophobic coating on the camera window that effectively repels water and dirt laden airborne droplets that may breach the two air barriers and reach the window. The coating resists any significant accumulation on the camera window and effectively keeps it clean. The application of a hydrophobic coating on the camera window can also dramatically reduce moisture formation or staining on the camera window and accumulation of particles that may reach the surface of the camera window despite the above subsystems.

The PAPS reduces camera maintenance without adding additional consumable parts or material that increases the level and frequency of maintenance for a camera or site. Other than a visual inspection when on site for regular scheduled maintenance, the PAPS requires no specific servicing (high reliability fan, 8 year MTBF), and no filter replacement or cleaning is required.

In one aspect, the PAPS and features thereof can be added to an existing active surface, or built into a new active surface. In one aspect, the PAPS can have three main components added to an existing active surface, such as window of camera system, namely: a Positive Pressure Source to providing clean air at over ambient air pressure to the system; a shroud establishing a protective barrier around the active surface or window; and an airway connecting the Positive Pressure Source to the shroud.

The shroud can be made from any opaque material using any manufacturing process resulting in a structure strong enough to maintain shape, orientation and proximity to the active surfaces while subjected to the dynamic conditions likely to be encountered, for example high speed winds/gusts, vehicle pressure wave buffeting, and ice accretion. The shroud's purpose is to protect the active surface from extraneous light (sunlight in the case of a camera or optical sensor) and the deposition of salt, dirt and grime which would negatively impact image quality or sensor performance. Protection is provided by both Passive Protective Measures and Active Protective Measures.

Passive Protective Measures:

No direct access: The shroud's geometry prevents sunlight and heavier falling particles (rain and snow) from reaching the active surface by offering no direct path to the active surface. These particles would have to alter their typical trajectory to reach the active surface; in essence travelling uphill against the force of gravity.

Passive Back Pressure Compartment/Compaction Zone: A semi enclosed space in front of the active surface is organized into two spaces/zones. The outer/compaction zone adjacent to the open end with a large external opening that decreases in sectional area as it progresses towards a baffle. This results in a progressively shrinking volume from the open end to the baffle end where an orifice joints the compaction zone to the dead air zone adjacent to the active surface. Large pressure differentials, such as wind gusts and pressure waves which can precede vehicles, are buffered and slowed down as they enter the large open end compacting the air within. This helps prevent finer droplets and particles being carried along by the pressure wave and reaching the active surface. The deeper the pressure front penetrates the semi enclosed air space the greater the pressure differential created further slowing the progress of the droplets and particles;

Passive Back Pressure Compartment/Dead-airspace Zone: A baffle subdivides the shroud's enclosed air volume. The baffle, while not restricting the active surface's field of view, helps minimize the intermixing of the incoming air with the air in proximity to the active surface. If the volume adjacent to the active surface is filled with relatively clean air, it will be this non-circulating air (dead air) that remains as a protective boundary between the active surface and intruding pressure wave born contaminates.

Hydrophobic coatings applied to the active surface will offer additional protection by reducing the deposition of contaminates that may reach the active surface.

Drip edge: Directs the flow of rain water away from the active surface's field of view. It prevents the formation of icicles in the field of view of the active sensor.

Active Protective Measures:

The positive air pressure source is equipped with a Clean Air Intake (CAI) and is sized to ensure that the semi enclosed air space created by the shroud is filled with a constant supply of clean air at a pressure above ambient pressure. This is achieved by: 1) Locating the air intake as far away from the traffic pressure plum zone as practical, in this case the intake is located approximately 9 feet above the shroud, but could be located even further away such as the end of the gantry at the side of the road; 2) Restricting or slowing the air intake velocity to the point that the droplets and particles settle faster than they are drawn into the system; 3) Ensuring the air flow within the intake is oriented to allow gravity to assist in settling out particles.

When higher than ambient pressure air flow is introduced into the dead airspace zone (Passive Back Pressure/Dead-airspace Zone) between the baffle and the active surface, a positive pressure chamber (PPG) of higher than ambient air pressure is created. This pressure zone is configured to ensure that clean air flows away from the active surface in a uniform manner such that no back eddies are formed which could draw fine mist/droplets or particles into the region adjacent to the active surface. This enhances the performance of the PBPC Dead-airspace Zone.

In one aspect, an optional check valve between the shroud's PPC inlet and the positive pressure source can offer additional protection by preventing the possibility of back flow in the systems airway during high speed gusts or pressure waves.

The airway connecting the CAI and the shroud is designed to allow additional settling of particles/droplets and incorporates a particle trap to further promote clean air entering the shroud.

In another aspect, the PAPS could be implemented with only passive protective features.

Figure 5:
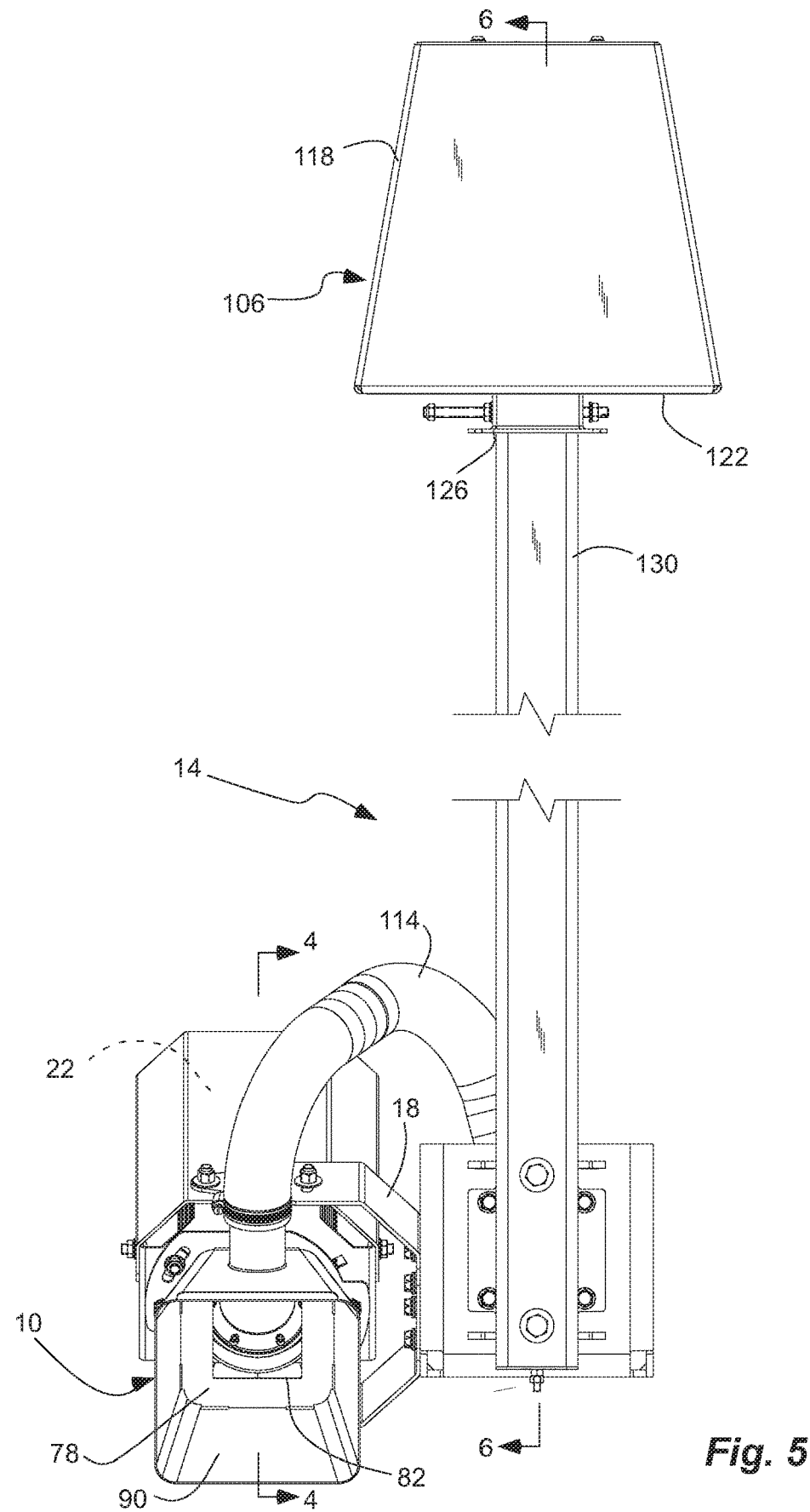
FIG. 5 is a front view of the PAPS of FIG. 1.
Figure 6:
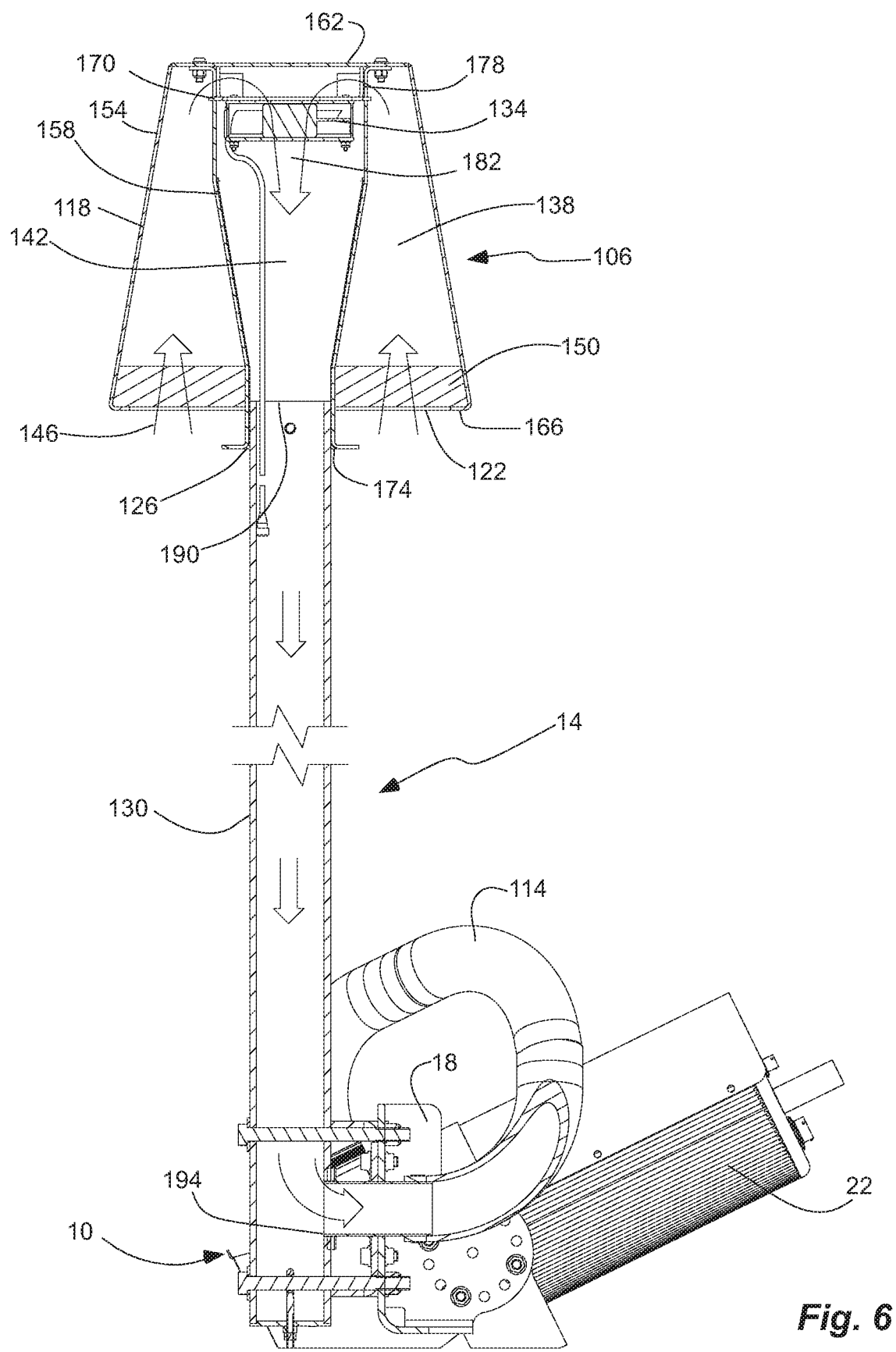
FIG. 6 is a cross-sectional side view of the PAPS of FIG. 1, taken along line 6 of FIG. 5, and also showing air flow schematically.

FIG. 1 depicts a partial perspective view of a positive pressure device 10 of a positive air pressure system (PAPS) (14 in FIGS. 5 and 6). By way of example, the positive pressure device 10 is shown with a camera mount 18 for a camera (22 in FIGS. 4 and 6). The positive pressure device 10 has been removed from the PAPS 14 in FIG. 1 for clarity. Similarly, FIG. 2 depicts a front view of the positive pressure device 10; again removed from the PAPS 14. Similarly, FIG. 3 depicts a side view of the positive pressure device 10; again removed from the PAPS 14. The camera 22 can have a camera sensor (not shown), such as a CCD or CMOS, for sensing light and capturing images. In addition, the camera 22 and the sensor can be disposed in a housing or camera enclosure with a camera window 26 (FIGS. 2 and 4) disposed in front of the camera sensor to protect the sensor. The camera window 26 can define an active surface which is subjected to ambient conditions, including moisture and dirt, and which is desired to be kept clean and free of fouling in order to obtain clear pictures with the camera 22.

The camera mount 18 can carry the camera 22, and the positive pressure device 10. The camera mount 18 can comprise a yoke 30 that can be mounted to a support structure, such as a gantry 34 (FIG. 7) and associated structure (such as tube 130 in FIG. 7). In addition, the camera mount 18 can also comprise a plate or collar 38 carried by the yoke 30, and to which the camera 22 and the positive pressure device 10 can be mounted. The plate or collar 38 has a hole 42 aligned with the camera window 26. Furthermore, the camera mount 18 can comprise a sunshield 46 mounted to the plate or collar 38, and the yoke 30, and disposed over the camera 22. The camera mount 18, the yoke 30 and the plate or collar 38 can be formed of sheet metal, and can be bent or welded into the desired shape. In addition, the camera mount 18, the yoke 30 and the plate or collar 38 can be bolted together with bolts through holes or slots to allow relative adjustment.

The positive pressure device 10 comprises a shroud 50 coupled to the camera 22, via the mount 18. Thus, in one aspect, the shroud 50 can be indirectly attached to the camera 22, with the camera 22 and the shroud 50 both attached to the camera mount 18, or plate or collar 38 thereof. Alternatively, the shroud 50 can be directly mounted to the camera 22. The shroud 50 can be a frustum or a frustum-shaped shell 54 that is hollow and has a continuous perimeter wall 58. In one aspect, the shroud 50 and the frustum or shell 54 can have an appropriate cross-sectional shape, such as square with rounded corners, as shown, to match the camera window 26 or camera sensor. In another aspect, the shroud 50 and the frustum or shell 54 can have a round conical shape. The shroud 50 and the frustum or shell 54 have opposite open ends, namely a proximal open end 62 and a distal open end 66. The proximal open end 62 can be disposed adjacent the active surface or camera window 26. In addition the proximal open end 62 can be closed at the active surface or camera window 26, such as by the mount 18 or the plate or collar 38 thereof. In one aspect, the proximal open end 62 is essentially or substantially sealed with respect to the camera 22, the camera window 26, and the plate or collar 38 of the camera mount 18. As described below, the shroud 50 or the frustum or shell 54 will receive air to create a positive air pressure. It is not necessary for the open end 62 of the shroud 50 or the frustum or shell 54 to be perfectly sealed with respect to the mount 18 or the plate or collar 38 thereof, and some air leakage is acceptable, with a majority of air exiting the distal open end 66. The proximal open end 62 can be aligned with the hole 42 of the plate or collar 38, the camera window 26 and the camera sensor. An annular flange 70 can circumscribe the proximal open end 62 of the shroud 50 or the frustum or shell 54. The annular flange 70 can be coupled to the plate or collar 30 of the mount 18. The distal open end 66 is opposite, and aligned with, the proximal open end 62. Thus, both the open ends 62 and 66 can be aligned with the hole 42 of the plate or collar 38, the camera window 26 and the camera sensor. The shroud 50 and the frustum or shell 54 can have or can define a longitudinal axis 74 (FIG. 3) extending between the opposite open ends 62 and 66.

In addition, the positive pressure device 10, the shroud 50 and the frustum or shell 54 have a baffle plate 78 disposed therein. The baffle plate 78 can traverse an interior of the shroud 50 and the frustum or shell 54. In addition, the baffle plate 78 is oriented transverse to the axis 74 thereof. The baffle plate 78 can be located intermediate the opposite open ends 62 and 66 of the shroud 50 and the frustum or shell 54. In one aspect, the baffle plate 78 can be located closer to the proximal open end 62 than the distal open end 66. The baffle plate 78 has an outer perimeter contiguous with, and adjoining, an interior surface of the shroud 50 and the frustum or shell 54. Thus, an outer shape and size of the baffle plate 78 can match an interior surface and size of the shroud 50 and the frustum or shell 54 at the intermediate point. The shroud 50 and the baffle plate 78 can be formed by sheet metal, cut and bent to shape.

The baffle plate 78 has an orifice 82 therein. The orifice 82 can be a single orifice and can be centered in the baffle plate 78 and aligned with the axis 74 and the opposite open ends 62 and 66 of the shroud 50 and the frustum or shell 54. The orifice 82 can be sized, with a width or diameter, to be substantially the same size as, or larger than, a width or diameter of the hole 26 in the plate or collar 38, and the camera window 26, so as not to obstruct the field of view of the camera 22. The baffle plate 78 and the orifice 82 can have a shape to match the camera sensor, such as square. In one aspect, the orifice 82 can be approximately 33% of a surface area of the baffle plate 78.

FIG. 4 depicts a cross-sectional side view of the positive pressure device 10 showing the structure thereof, and schematically showing the operation, including airflow, thereof. The baffle plate 78 divides the shroud 50 and the frustum or shell 54 into baffles, namely a proximal baffle 86 and a distal baffle 90. The baffles 86 and 90 are interconnected through the orifice 82. The proximal baffle 86 can be defined between the baffle plate 78 and the proximal open end 62, or the plate or collar 38, or the camera window 26. The proximal baffle 86 can be substantially enclosed by the baffle plate 78, the perimeter wall 58 of the shroud 50, the camera window 26, and the plate or collar 38 of the camera mount 18, except for the orifice 82 and the inlet opening 102 (as described below). The distal baffle 90 can be defined between the baffle plate 78 and the distal open end 66.

The shroud 50 and the frustum or shell 54 can have a shape and size enlarging from a smaller proximal open end 62 to a larger distal open end 66. The distal open end 66 can be larger than the proximal open end 62. Thus, the enlarged distal open end 66 narrowing towards the baffle plate 78 and the proximal open end 62 creates a dead-air buffer, represented at 94, in the distal baffle 90, define a passive back pressure chamber (PBPC) in the distal baffle 90. Air attempting to enter the device 10, the shroud 50, the frustum or shell 54, and the passive back pressure chamber of the distal baffle 90, represented by arrows 98, creates an increasing air pressure by itself and the dead-air buffer 94, to resist progression of the air flow into the shroud 50 and towards the camera window 26. The shroud 50 and the frustum or shell 54 can have length greater than width or diameter of the proximal open end 62, and thus the active surface or camera window 26. The length of the shroud 50 and the frustum or shell 54 can be substantially the same as the width or diameter of the distal open end 66.

In addition to the passive back pressure chamber, the device 10, the shroud 50 and the frustum or shell 54 also have a positive pressure chamber (PPC) in the proximal baffle 86. An inlet opening 102 is formed in the perimeter wall 58 of the shroud 50 and the frustum or shell 54, and open into or in fluid communication with the proximal baffle 86. The inlet opening 102, and thus the proximal baffle 86, is coupled to or in fluid communication with a positive pressure air source 106 (FIGS. 5 and 6) by an airway, described in greater detail below. The inlet opening 102 can have a nipple 110 fastened to and extending from the perimeter wall 58 of the frustum or shell 54 to receive a hose 114 from the positive pressure source 106. The positive pressure chamber in the proximal baffle 86 receives air through the inlet opening 102 from the positive pressure air source 106 to create a high-pressure region, with a pressure greater than a pressure region in the distal baffle 90, in front of the active surface or camera window 26, and expels the air out of the positive pressure chamber and proximal baffle 86, and into the distal baffle 90 through the orifice 82 in the baffle plate 78.

In one aspect, a check valve 116 can be disposed between the shroud 50 or the inlet opening 102 thereof and the positive pressure air source 106 to resist back flow. For example, the check valve 116 can comprise a flap disposed in the nipple 110.

FIG. 5 depicts a front view of the positive air pressure system (PAPS) 14, including the positive pressure device 10 and an exemplary positive pressure air source 106. Similarly, FIG. 6 depicts a cross-sectional side view of the PAPS 14 including the positive pressure air source 106. The air source 106 can comprise an air intake 118 with an air intake opening 122 and an air discharge 126. The air intake can provide clean air without the use of a physical filter media. The air discharge 126 of the air source 106, and the air intake 118, can be coupled to the hose 114, via a tube 130 described below, and in fluid communication with the inlet opening 102 of the shroud 50 and the frustum or shell 54. In addition, the air source 106 and the air intake 118 can comprise an air displacement device, such as a fan 134. The fan 134 can divide the air intake 118 into a low-pressure chamber 138 and a high-pressure chamber 142. The low-pressure chamber 138 can be defined between the air intake opening 122 and the air displacement device or fan 134. The high-pressure chamber 142 can be defined between the air displacement device or fan 134 and the air discharge 126. The air intake opening 122 is substantially larger than the air displacement device or fan 134 and the air discharge 126. Thus, the large opening 122 can define a low-speed air intake to create a low air pressure in the low-pressure chamber 138 of the air intake 118. In addition, the large opening 122 can define a low-speed air flow, represented by arrow 146, into the air intake opening 122. The low-pressure chamber 138 and the low-speed air flow resist drawing airborne particles into the air intake opening 122. In addition, the air intake opening 122 can comprise a screen or flow restrictor 150 spanning and covering the air intake opening 122 which can also resist entry of larger particles.

The air source 106 and the air intake 118 can comprises hollow, nested, inverted frustums, namely an outer shell 154 and an inner shell 158. The outer shell 154 can be upright, and can have a smaller closed top 162, and a larger open bottom 166, defining the air intake opening 122 of the air intake 118. The inner shell 158 can be inverted, or inverted with respect to the outer shell 154, and can be disposed in the outer shell 154. The inner shell 158 can have a larger open top 170, and a smaller open bottom 174, defining the air discharge 126 of the air intake 118. In one aspect, the air intake opening 122, and thus the larger open bottom 166, and the air discharge 126, and thus the smaller open bottom 174, can be concentric and facing the same direction, such as downwardly.

An open junction 178 can be disposed between the closed top 162 of the outer shell 154 and the open top 170 of the inner shell 158. For example, the open top 170 of the inner shell 158 can be spaced-apart from the closed top 162 of the outer shell 154 to define the open junction 178 between the two. An air flow path, represented by arrow 182, can be defined from the large open bottom 166, and the air intake opening 122; up through the outer shell 154, and the low-pressure chamber 138; through the open junction 178; down through the inner shell 158, and the high-pressure chamber 142; and out the smaller open bottom 174, and the air discharge 126. Again, the fan 134 is disposed adjacent the open junction 178 to displace air from the outer shell 154 and low-pressure chamber 138, and into the inner shell 158 and the high-pressure chamber 142, and along the air flow path 182.

As described above, one or more cameras can be used, each with its own shroud. In one aspect, each camera and shroud can have its own air source. In another aspect, an air source can be operatively coupled to two or more shrouds. In another aspect, a single air source can supply multiple shrouds.

Figure 7:
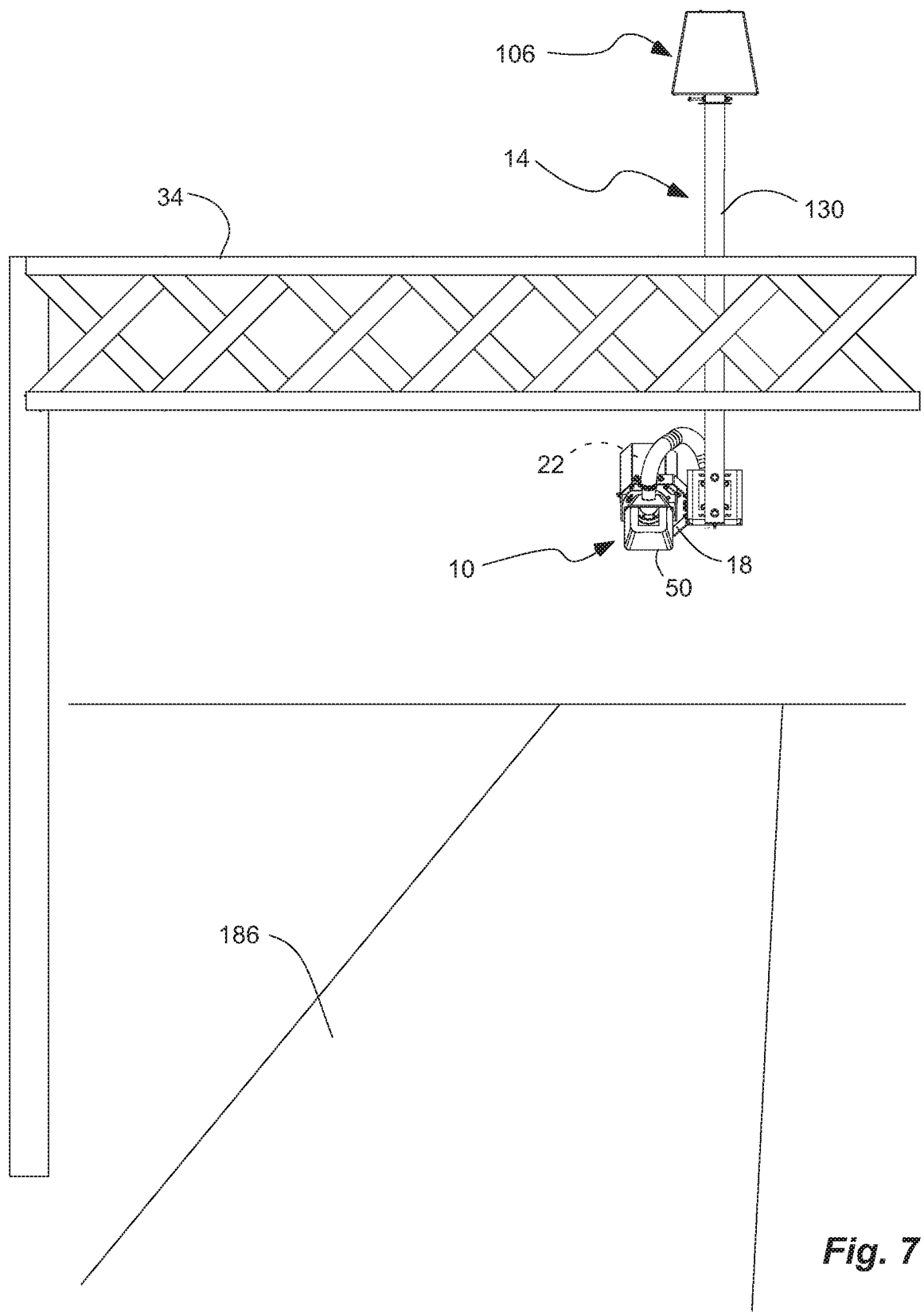
FIG. 7 is a perspective schematic view of the PAPS of FIG. 1 shown mounted to a gantry over a roadway as part of a tolling camera system.

FIG. 7 depicts the PAPS 14, with the camera 22, the positive pressure device 10 or the shroud 50, and the air source 106 or air intake 118, mounted to the gantry 34 over a roadway 186. In one aspect, the PAPS 14 can be part of a tolling camera system with one or more cameras or PAPS mounted on the gantry 34 over or alongside the roadway 186. The PAPS 14 can further comprise the tube 130. As described above, the air discharge 126 of the air source 106 and the air intake 118 can be coupled to and in fluid communication with the inlet opening 102 of the shroud 50 and the frustum or shell 54 via the tube 130 and the hose 114. The tube 130 can be elongated and oriented substantially vertically. The tube 130 can have an upper inlet 190 coupled to or in fluid communication with the air discharge 126 of the air source 106 or air intake 118. In addition, the tube 130 can have a lower outlet 194 coupled to or in fluid communication with the inlet opening 102 of the shroud 50 and the frustum or shell 54, as shown in FIG. 6.

In addition, the tube 130 can be rigid and hollow. Thus, the tube 130 can provide both a conduit for air between the air intake 118 and the shroud 50, and can be used to mount the camera 22, the shroud 50, and the air intake 118 to the gantry 34. The camera 22 and the shroud 50 can be mounted to the tube 130 via the camera mount 18, and can be located neared a lower end of the tuber 130 adjacent the lower outlet 194. Similarly, the air source 106 and the air intake 118 can be mounted to the tube 130 and located nearer an upper end of the tube 130. In one aspect, an open upper end of the tuber 130 can be received in the open bottom 174 of the inner shell 158 or the air discharge 126 of the air intake 118. In addition, the air intake 118 can be mounted to the gantry 34 at a position above the shroud 50 and the camera 22, which are located closer to the roadway 186. Thus, the air intake opening 122 of the air intake 118 or the air source 106 can be elevated above the shroud 50. Thus, the air intake opening 122 is elevated above the roadway 186 and a majority of the debris. In addition, the air intake opening 122 of the air intake 118 can face downwardly to avoid capturing particles.

Referring again to FIG. 6, the lower outlet 194 of the tube 130 can be formed in a lateral side of the tube 130, and above a bottom of the tube 130. Thus, the bottom of the tube 130 can be closed by a cap and can act as a debris trap.

Referring again to FIGS. 1, 3 and 4, a lip can be formed on top of the shroud 50 or the frustum or shell 54 at the distal open end 66 to resist moisture or ice accumulation from dripping or forming in front of the distal open end 66.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A positive air pressure device configured to resist fouling of an active surface, the device comprising:
    a shroud having opposite open ends including a proximal open end configured to be closed when mounted adjacent the active surface, and a distal open end opposite the proximal open end, the shroud having an axis between the opposite open ends;

a baffle plate disposed in the shroud and traversing an interior of the shroud and oriented transverse to the axis of the shroud, and an orifice therein aligned with the opposite open ends;

the baffle plate dividing the shroud into baffles interconnected through the orifice including a proximal baffle between the baffle plate and the proximal open end and a distal baffle between the baffle plate and the distal open end; and an inlet opening formed in an outer wall of the shroud at a location offset from the baffle plate, the inlet opening in fluid communication with the proximal baffle and configured to be in fluid communication with a positive pressure air source to define a positive pressure chamber in the proximal baffle configured to receive air through the inlet opening from the positive pressure air source and create a high-pressure region, greater than a pressure region in the distal baffle, in front of the active surface and to expel air out of the positive pressure chamber and into the distal baffle through the orifice in the baffle plate, wherein the positive pressure air source further comprises:

an air intake with an air intake opening and an air discharge coupled to the inlet opening of the shroud;

an air displacement device dividing the air intake into a low-pressure chamber between the air intake opening and the air displacement device, and a high-pressure chamber between the air displacement device and the air discharge; and the air intake opening being larger than the air displacement device and the air discharge to define a low-speed air intake configured to create a low air pressure in the low-pressure chamber in the air intake and a low-speed air flow into the air intake opening to resist drawing airborne particles into the air intake opening.

2. The device of claim 1, further comprising:
the shroud comprising a frustum-shaped shell enlarging from the proximal open end to the distal open end with the distal open end being larger than the proximal open end and configured to create a dead-air buffer in the distal baffle to define a passive back pressure chamber in the distal baffle.

3. The device of claim 1, wherein the air intake comprises hollow, nested, inverted frustums, comprising:
an outer shell with a smaller closed top and a larger open bottom defining the air intake opening of the air intake;
an inner shell disposed in the outer shell and being inverted with respect to the outer shell, and having a larger open top and a smaller open bottom defining the air discharge of the air intake;
an open junction between the closed top of the outer shell and the open top of the inner shell;
an air flow path defined from the large open bottom, up through the outer shell, through the open junction, down through the inner shell, and out the smaller open bottom; and
a fan disposed adjacent the open junction and configured to displace air from the outer shell into the inner shell and along the air flow path.

4. The device of claim 3, further comprising:
the air intake opening and the air discharge of the air intake being concentric and facing the same direction.

5. The device of claim 1, further comprising:
the air intake opening of the air intake being elevated above the shroud; and
the air intake opening facing downwardly.

6. The device of claim 1, further comprising:
an elongated tube carrying the air intake and having an upper inlet coupled to the air discharge of the air intake, and a lower outlet coupled to the inlet opening of the shroud; and
the air intake being located nearer an upper end of the tube, and the shroud being located nearer a lower end of the tube, such that the air intake is elevated above the shroud.

7. The device of claim 1, further comprising:
the shroud being coupled to an active surface;
the active surface being mounted to a support structure;
the air intake being mounted to the support structure at a position above the shroud and the active surface.

8. The device of claim 1, further comprising:
a camera having a window defining the active surface; and
the proximal open end of the shroud mounted adjacent to the window of the camera with the aperture of the baffle plate aligned with the window.

9. The device of claim 8, wherein the proximal baffle is substantially enclosed except for the orifice and the inlet opening; and wherein the proximal open end of the shroud is substantially sealed with respect to the camera.

10. The device of claim 1, further comprising:
an annular flange circumscribing the proximal open end of the shroud;
a mount configured to carry a camera with a window, and having a hole configured to be aligned with the window; and
the annular flange coupled to the mount with the orifice of the baffle plate aligned with the hole of the mount.

11. A positive air pressure system comprising:
a shroud having opposite open ends including a proximal open end configured to be closed adjacent an active surface, and a distal open end opposite the proximal open end, the shroud having an axis between the opposite open ends;
a baffle plate disposed in the shroud and traversing an interior of the shroud and oriented transverse to the axis of the shroud, and an orifice therein aligned with the opposite open ends;
the baffle plate dividing the shroud into baffles interconnected through the orifice including a proximal baffle between the baffle plate and the proximal open end and a distal baffle between the baffle plate and the distal open end;
the shroud having a frustum-shaped shell enlarging from the proximal open end to the distal open end with the distal open end being larger than the proximal open end configured to create a dead-air buffer in the distal baffle to define a passive back pressure chamber in the distal baffle;
an inlet opening formed in an outer wall of the shroud at a location offset from the baffle plate, the inlet opening in fluid communication with the proximal baffle;
a positive pressure air source having an air intake with an air intake opening and an air discharge coupled to the inlet opening of the shroud, and an air displacement device dividing the air intake into a low-pressure chamber between the air intake opening and the air displacement device, and a high-pressure chamber between the air displacement device and the air discharge, the air intake opening being larger than the air displacement device and the air discharge to define a low-speed air intake configured to create a low air pressure in the low-pressure chamber in the air intake and a low-speed air flow into the air intake opening to resist drawing airborne particles into the air intake opening; and an airway connecting the positive pressure air source to the inlet opening formed in the shroud.

12. The system of claim 11, wherein the air intake comprises hollow, nested, inverted frustums, comprising:
an outer shell with a smaller closed top and a larger open bottom defining the air intake opening of the air intake;
an inner shell disposed in the outer shell and being inverted with respect to the outer shell, and having a larger open top and a smaller open bottom defining the air discharge of the air intake;
an open junction between the closed top of the outer shell and the open top of the inner shell;
an air flow path defined from the large open bottom, up through the outer shell, through the open junction, down through the inner shell, and out the smaller open bottom; and
a fan disposed adjacent the open junction and configured to displace air from the outer shell into the inner shell and along the air flow path.

13. The system of claim 11, further comprising:
the air intake opening of the air intake being elevated above the shroud; and
the air intake opening facing downwardly.

14. The system of claim 11, wherein the airway further comprises:
an elongated tube carrying the air intake and having an upper inlet coupled to the air discharge of the air intake, and a lower outlet coupled to the inlet opening of the shroud; and
the air intake being located nearer an upper end of the tube, and the shroud being located nearer a lower end of the tube, such that the air intake is elevated above the shroud.

15. The system of claim 11, further comprising:
the shroud being coupled to an active surface;
the active surface being mounted to a support structure;
the air intake being mounted to the support structure at a position above the shroud and the active surface.

16. The system of claim 11, further comprising:
an active surface; and
the proximal open end of the shroud mounted adjacent to the active surface with the orifice of the baffle plate aligned with the active surface.

17. The system of claim 16, wherein the proximal baffle is substantially enclosed except for the orifice and the inlet opening; and wherein the proximal open end of the shroud is substantially sealed with respect to the active surface.

18. The system of claim 11, further comprising:
an annular flange circumscribing the proximal open end of the shroud;
a mount configured to carry a camera with a window, and having a hole configured to be aligned with the window; and
the annular flange coupled to the mount with the aperture of the baffle plate aligned with the hole.

19. The system of claim 11, further comprising a hydrophobic coating applied to the active surface.

20. A positive air pressure system, comprising:
an active surface;
a shroud having opposite open ends including a proximal open end closed adjacent the active surface, and a distal open end opposite the proximal open end, the shroud having an axis between the opposite open ends;
a baffle plate disposed in the shroud and traversing an interior of the shroud and oriented transverse to the axis of the shroud, and having an outer perimeter contiguous an interior surface of the shroud, and an orifice therein aligned with the opposite open ends;
the baffle plate dividing the shroud into baffles interconnected through the orifice including a proximal baffle between the baffle plate and the proximal open end and a distal baffle between the baffle plate and the distal open end; and
an inlet opening formed in an outer wall of the shroud at a location offset from the baffle plate, the inlet opening in fluid communication with the proximal baffle;
a positive pressure air source coupled to the shroud and in fluid communication with the inlet opening of the shroud, and configured to introduce air into the proximal baffle through the inlet opening to define a positive pressure chamber in the proximal baffle and create a high-pressure region, greater than a pressure region in the distal baffle, in front of the active surface and to expel air out of the positive pressure chamber and into the distal baffle through the orifice in the baffle plate; and
the positive pressure air source having an air intake with an air intake opening and an air discharge coupled to the inlet opening of the shroud, and an air displacement device dividing the air intake into a low-pressure chamber between the air intake opening and the air displacement device, and a high-pressure chamber between the air displacement device and the air discharge, the air intake opening being larger than the air displacement device and the air discharge to define a low-speed air intake configured to create a low air pressure in the low-pressure chamber in the air intake and a low-speed air flow into the air intake opening to resist drawing airborne particles into the air intake opening.

21. The system of claim 20, further comprising:
the active surface being mounted to a support structure;
an elongated tube carrying the air intake and having an upper inlet coupled to the air discharge of the air intake, and a lower outlet coupled to the inlet opening of the shroud; and
the air intake being located nearer an upper end of the tube, and the shroud being located nearer a lower end of the tube, such that the air intake is elevated above the shroud.

22. The system of claim 20, wherein the active surface comprises a hydrophobic coating.

* * * * *